(12) United States Patent
Cai et al.

(10) Patent No.: US 8,356,025 B2
(45) Date of Patent: Jan. 15, 2013

(54) SYSTEMS AND METHODS FOR DETECTING SENTIMENT-BASED TOPICS

(75) Inventors: Keke Cai, Beijing (CN); Ying Chen, San Jose, CA (US); William Scott Spangler, San Martin, CA (US); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/634,269

(22) Filed: Dec. 9, 2009

(65) Prior Publication Data

US 2011/0137906 A1 Jun. 9, 2011

(51) Int. Cl.
*G06F 17/30* (2006.01)

(52) U.S. Cl. .................. 707/708; 707/739; 707/769

(58) Field of Classification Search .................. None
See application file for complete search history.

(56) References Cited

U.S. PATENT DOCUMENTS

| | | |
|---|---|---|
| 6,999,914 B1 | 2/2006 | Boerner et al. |
| 2003/0191627 A1* | 10/2003 | Au .................................. 704/9 |
| 2005/0125216 A1* | 6/2005 | Chitrapura et al. ............. 704/1 |
| 2005/0130110 A1* | 6/2005 | Gosling ..................... 434/322 |
| 2006/0069589 A1* | 3/2006 | Nigam et al. ..................... 705/1 |
| 2006/0230071 A1* | 10/2006 | Kass et al. ................ 707/104.1 |
| 2007/0198459 A1* | 8/2007 | Boone et al. ...................... 707/1 |
| 2008/0086363 A1* | 4/2008 | Kass et al. ..................... 705/10 |
| 2008/0133488 A1* | 6/2008 | Bandaru et al. ................... 707/3 |
| 2008/0189634 A1* | 8/2008 | Tevanian et al. ............. 715/764 |
| 2008/0215571 A1* | 9/2008 | Huang et al. ..................... 707/5 |

(Continued)

FOREIGN PATENT DOCUMENTS

WO   WO 2006/113761 A2   10/2006

OTHER PUBLICATIONS

Mullen, Tony and Collier, Nigel, Incorporating topic information into sentiment analysis models, paper, publication date unknown, both authors list addresses as "National Institute of Informataics, Tokyo, Japan," other than this it is unknown; at this time, to the applicants, who or where this paper was published.

(Continued)

*Primary Examiner* — Syed Hasan
(74) *Attorney, Agent, or Firm* — Malcolm Whittaker; Brian K. Lambert

(57) ABSTRACT

A method for analyzing sentiment comprising: collecting an object from an external content repository, the collected objects forming a content database; extracting a snippet related to the subject from the content database; calculating a sentiment score for the snippet; classifying the snippet into a sentiment category; creating sentiment taxonomy using the sentiment categories, the sentiment taxonomy classifying the snippets as positive, negative or neutral; identifying topic words within the sentiment taxonomy; classifying the topic words as a sentiment topic word candidates or a non-sentiment topic word candidate, filtering the non-sentiment topic word candidates; identifying the frequency of the non-sentiment topic words in each of the sentiment categories; identifying the importance of the non-sentiment topic word for each of the sentiment categories; and, ranking the topic word, wherein the rank is calculated by combining the frequency of the topic words in each of the categories with its importance.

15 Claims, 3 Drawing Sheets

U.S. PATENT DOCUMENTS

| | | | |
|---|---|---|---|
| 2008/0270116 A1* | 10/2008 | Godbole et al. | 704/9 |
| 2008/0313130 A1* | 12/2008 | Hammond et al. | 707/2 |
| 2009/0024409 A1 | 1/2009 | Steelberg et al. | |
| 2009/0048823 A1* | 2/2009 | Liu et al. | 704/9 |
| 2009/0100078 A1* | 4/2009 | Lai et al. | 707/100 |
| 2009/0222551 A1* | 9/2009 | Neely et al. | 709/224 |
| 2009/0281906 A1* | 11/2009 | Cai et al. | 705/26 |
| 2009/0319342 A1* | 12/2009 | Shilman et al. | 705/10 |
| 2010/0145940 A1* | 6/2010 | Chen et al. | 707/736 |
| 2011/0112825 A1* | 5/2011 | Bellegarda | 704/9 |

OTHER PUBLICATIONS

Kim, Soo-Min and How, Eduard, Extracting Opinions, Opinion Holders, and Topics Expressed in Online News Media Text, paper, Proceedings of the Workshop on Sentiment and Subjectivity of Text, pp. 1-8, Sydney, [Australia.] Jul. 2008, Association for Computational Linguistics.

Genereux, Michel and Evans, Roger, paper, Towards a validated model for affective classification of texts, Proceedings of the Workshop on Sentiment and Subjectivity of Text, pp. 55-62, Sydney, [Australia,] Jul. 2006, Association for Computational Linguistics.

* cited by examiner

SYSTEMS AND METHODS FOR DETECTING SENTIMENT-BASED TOPICS

RELATED CO-PENDING PATENT APPLICATION

This patent application is related to co-pending U.S. patent application Ser. No. 12/331,271, entitled, "Systems and Methods for Analyzing Electronic Text."

FIELD OF THE INVENTION

Embodiments of the disclosure relate generally to the field of detection of sentiment-based topics. For example, embodiments of the disclosure relate to systems and methods for coupling sentiment analysis of web content with techniques for detecting information that is highly correlated with positive or negative opinions.

BACKGROUND

The widespread availability of consumer generated media (CGM), such as blogs, message boards, comments on articles, Twitter and the world wide web in general, has created a substantial new medium that allows ordinary consumers to voice their views, positive, negative or neutral, about a product, service or idea. Existing work in the area of analyzing consumer sentiment analysis has typically focused on Semantic-based approaches.

Semantic-based approach generally relies on opinion work collection in the form of a "sentiment dictionary" or a large-scale knowledge base to assign "sentiments" to a document. For example, opinion words refer to those sentiments possessing positive or negative sentiments such as "awesome," "great," "love" or "terrible." However, this type of approach is not optimal because it may not appropriately capture the attitude or sentiment of the writer if the word is used in an unexpected way or in an unconventional sense. For example, a blog which described an item as "one that I love to hate," would probably be characterized as a "neutral," rather than a "negative" sentiment because it contained the "positive" sentiment "love," as well as the "negative" sentiment "hate." Thus, existing sentiment analysis methods would average the sentiment of each statement and conclude that it was a neutral, rather than a negative statement. Typically, existing sentiment analysis systems rely on sentiment polarity. Sentiment polarity divides words into positive, negative or neutral categories. This analysis is useful, but lacks insight as to the drivers behind the sentiments. For example, "unexciting" would be a very negative comment to make about a roller coaster, but could very well be a positive comment about a dental procedure. Thus, existing methods do not always capture the true sentiment of web-based content.

SUMMARY

A method for analyzing sentiment comprising: collecting an object from an external content repository, the collected objects forming a content database; extracting a snippet related to the subject from the content database; calculating a sentiment score for the snippet; classifying the snippet into a sentiment category; creating sentiment taxonomy using the sentiment categories, the sentiment taxonomy classifying the snippets as positive, negative or neutral; identifying topic words within the sentiment taxonomy; classifying the topic words as a sentiment topic word candidates or a non-sentiment topic word candidate, filtering the non-sentiment topic word candidates; identifying the frequency of the non-sentiment topic words in each of the sentiment categories; identifying the importance of the non-sentiment topic word for each of the sentiment categories; and, ranking the topic word, wherein the rank is calculated by combining the frequency of the topic words in each of the categories with its importance.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Embodiments of the disclosure relate generally to the field of detecting sentiment-based topics. For example, embodiments of the disclosure relate to systems and methods for leveraging sentiment analysis for topic detection. The inventors of the present invention have published an article entitled "Leveraging Sentiment Analysis for Topic Detection," wi-iat, vol. 1, pp. 265-271, 2008 IEEE/WIC/ACM International Conference on Web Intelligence and Intelligent Agent Technology, 2008, by Keke Cai, Scott Spangler, Ying Chen, Li Zhang, which is incorporated by reference into this application as if set forth fully herein. Throughout the description, for the purposes of explanation, numerous specific details are set forth in order to provide a thorough understanding of the present disclosure. It will be apparent, however, to one skilled in the art that the present disclosure may be practiced without some of these specific details.

Figure 1:
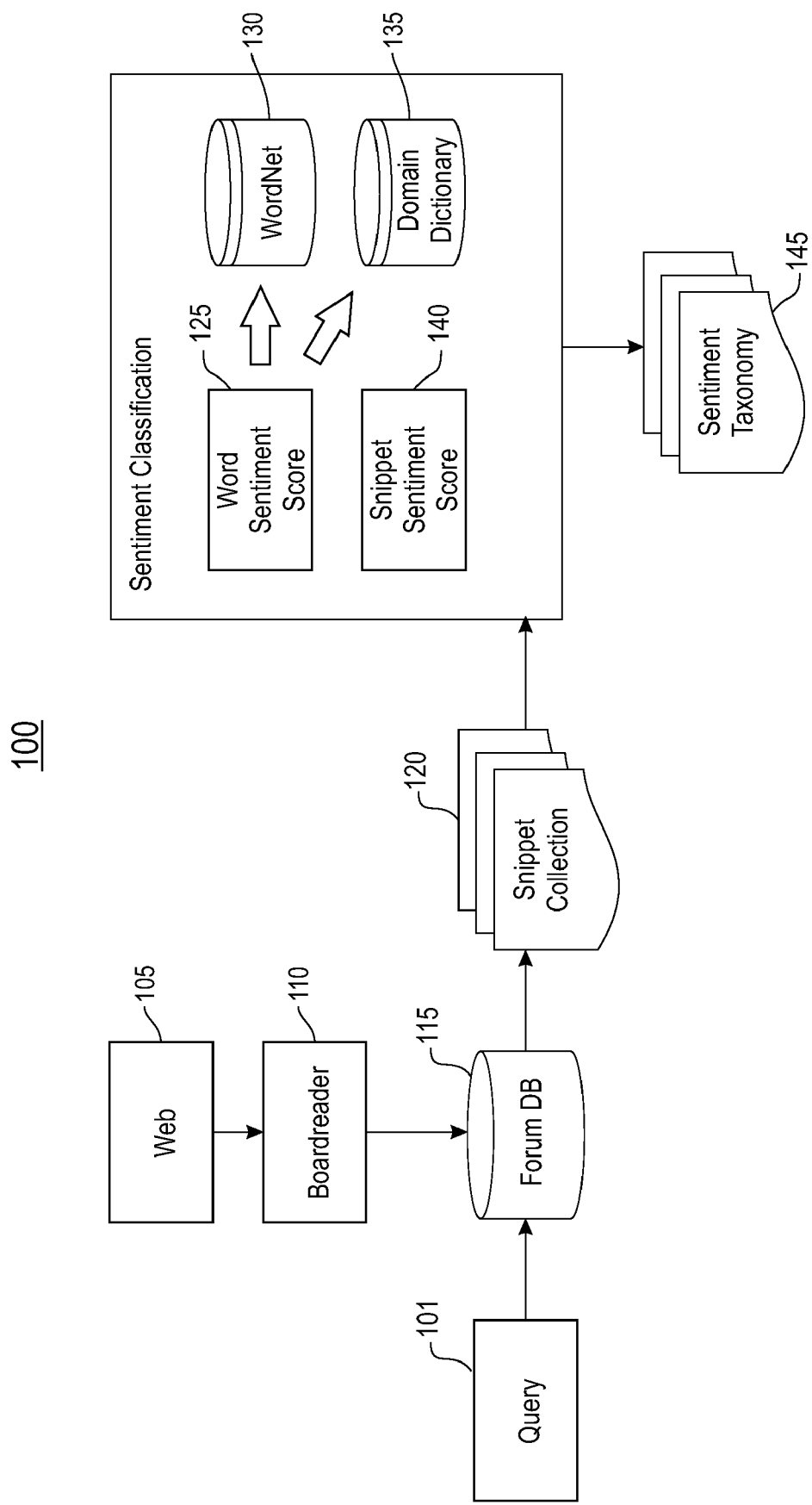
FIG. 1 is a block diagram of the architecture of a sentiment analysis system of the present invention.

FIG. 1 is illustrates is a block diagram 100 of an architecture of a sentiment-based topic analysis system of the present invention. At 101, the user may select an object that will be the subject of the sentiment-topic analysis. For example, this may be a product name, a brand name or name of a person or event, such as a fair or concert. Proceeding to 105, the system's board reader 110 collects related world wide web comments discussing certain content, also known as objects, from an external content repository, such as bulletin boards, blogs, reviews, news articles and the like, to create a web content data base 115. Preferably, board reader 110 collects "snippets" of text, rather than single words. Used in this context, a "snippet" is a small sample of text surrounding the word for the object of interest. This web content database 115 could be as large or small as is desired. For example, only certain webpages or content might be considered, or all content found on the web might be used to create the web content database 115. At 120, these snippets that contain the subject matter of interest are extracted from the web content database 115 and collected. 105, 110, 115 and 120 can broadly be categorized as constructing a sentiment lexicon.

As discussed above, a snippet is a small text segment around a specified keyword in a given document. The text segment can be defined by sentence boundaries, or a number of words. In general, snippets are built around core keywords, e.g., brand names or corporation names. "Snippetization" is important for analyzing web content, since web contents often are "noisy." They may cover diverse topics in one document, even though only a few sentences might be relevant to the analysis of the subject. Snippets allow users to focus on relevant text segments. This is especially important to sentiment analysis, since sentiment analysis of the overall document is likely to bias the opinion of the concerned subject, which on-topic snippet-based sentiment analysis could be much more meaningful. In the preferred embodiment, pre- and post-1 or 2 sentences are evaluated to construct each snippet.

Snippets from Snippet collection 120 are used to establish a Positive/Negative Word List(s). At the present time, the preferred embodiments for establishing the Positive/Negative Word List(s) are the General Inquirer database and Princeton University's WordNet® database. The General Inquirer database contains a substantial number of unique words. At the time of this application, the General Inquirer database contains about 4,000 words. For each word, it defines approximately 200 Boolean attributes. These attributes are used to determine the sense of a word. In other words, whether the word is used in a positive sense or a negative sense. According to information found on the website for the General Inquirer database, because overlaps exist among content-analysis tools as well as with "qualitative analysis", text-management, "natural language processing" and some artificial-intelligence software, it is important to have realistic expectations about what each content-analysis tool, including the General Inquirer, can readily provide. For some research projects, especially those involving intensive analyses of modest quantities of text, other text-analysis software may be much more appropriate.

The General Inquirer is basically a mapping tool. It maps each text file with counts on dictionary-supplied categories. The currently distributed version combines the "Harvard IV-4" dictionary content-analysis categories, the "Lasswell" dictionary content-analysis categories, and five categories based on the social cognition work of G. R. Semin and K. Fiedler, making for 182 categories in all. Each category is a list of words and word senses. A category such as "self-references" may contain only a dozen entries, mostly pronouns. Currently, the category "negative" is the largest with 2291 entries. Users can also add additional categories of any size. In order to map category assignments with reasonable accuracy, the General Inquirer software spends most of its processing time identifying commonly used word senses. For example, it distinguishes between "race" as a contest, "race" as moving rapidly, "race" as a group of people of common descent, and "race" in the idiom "rat race". The General Inquirer also cautiously removes common regular suffixes so that one entry in a category can match several inflected word forms. A category entry can be an inflected word (for example, "swimming"), a root word ("swim" would match "swimming", if "swimming" is not a separate entry) or a word sense (for example, "swim#1") identified by disambiguation routines of an inflected or root word form. These English stemming procedures, integrated with English dictionaries and routines for disambiguating English word senses, limit the current Inquirer system to English text applications.

Even though these disambiguation routines often require the Inquirer to make several passes through a sentence, the Inquirer is designed to process large amounts of text in a reasonable amount of time. Text files are grouped for processing into folders (compatible with input formats used by some other systems such as LIWC). The output is a matrix of "tag counts" for each category, with separate rows of counts for each file processed. Depending on the software and computer system used, as well as the length of each file, the Inquirer can assign counts for all 182 categories to text files at the rate of about a million words of text per hour. Some Inquirer projects indeed have involved analyzing several million of words of text. As with several other content-analysis systems such as LIWC, the Inquirer is especially suited for projects that draw on large amounts of text from the "information superhighway," as known as the world wide web or internet, where there are more documents being studied and/or larger amounts of text than can be coded either completely manually or with a computer-assisted manual procedure for assigning codes. The main output from the Inquirer can be displayed as an Excel spreadsheet, with both raw frequency counts and indexes scaled for document length.

According to the WordNet® website, found at http://.wordnet.princeton.edu/, WordNet® is a large lexical database of English words, developed by George A. Miller at Princeton University. Nouns, verbs, adjectives and adverbs are grouped into sets of cognitive synonyms, referred to as synsets, expressing a distinct concept. Synsets are interlinked by means of conceptual-semantic and lexical relationships. The resulting network of meaningfully related words and concepts can be navigated with a browser or other tool. The structure of WordNet® makes it a useful tool for computing linguistics and Natural Language Processing (NLP).

To construct a sentiment lexicon we begin by creating positive and negative word lists, which are preferably created using two external NLP resources: (i) the General Inquirer database and (ii) WordNet® for such purposes. At the present time, the Inquirer database contains more than 4,000 unique words, mostly adjectives. For each word it defines approximately 200 Boolean attributes. Some of these attributes are used to decide whether the word is used mostly in positive sense or in the negative sense. WordNet® 130 is an online lexical reference system whose design is inspired by current psycholinguistic theories of human lexical memory. English nouns, verbs and adjectives are organized into synonym sets, each representing one underlying concept. If most of the synonyms of a word are positive (or negative) according to the Inquirer, then the original word is marked as positive (or negative). For example, this process could result in a baseline list of 1905 Positive words and 2282 Negative words, which is then used for sentiment scoring 125, seen in FIG. 1. As also seen in FIG. 1, the Snippets from Snippet collection 120 are characterized by the degree, also referred to as the amount, of positive or negative sentiment each sentiment word conveys. In order to accurately score relative sentiment between different posts that both use positive/negative words, we attempt to characterize the degree (amount) of positive/negative sentiment each sentiment word conveys. This is done by looking up the words dictionary definition in WordNet® 130 and counting the occurrence of positive minus negative words in the definition. To normalize, we divide the sum by the total number of definitions. The occurrence of the word itself in its own definition is counted only once, where as other positive/negative words can be counted multiple times. As a further refinement, only adjective definitions are used, no other part of speech definitions are considered. This raw summation gives the relative amount of sentiment each individual word has. As an example, this method for the word "wonderful" might have a positive score of 13, because its one definition contains 13 positive words. The word "amnesty" has a much lower score of 1.25, because its four definitions contain 5 positive words.

At the present time, this is determined using word Synset definitions in WordNet®. Next, the system then assigns a sentiment score 125, illustrated in FIG. 1, to all words in the domain dictionary 135 that are defined in WordNet® 130. The same technique used for scoring negative/positive words in the original word lists can be used to score any word in the WordNet® dictionary. Only in the case of the dictionary, each word may have both a positive and a negative impact based on having both positive and negative words in its definition. This will generally give the dictionary terms less individual impact on the sentiment score than the words in the original Positive/Negative word list. Preferably, words that are not defined in WordNet® are ignored for the purposes of sentiment classification.

Next, these scores are used to classify the snippets into positive, neutral and negative categories from the Snippet Sentiment Score 140, illustrated in FIG. 1. The sum of the positive sentiment word scores for a given snippet, minus the sum of the negative sentiment word scores divided by the square root of the overall length of the snippet gives the overall snippet sentiment score which is a calculated as seen in Equation (1).

$$10.0F*(P-N)/\text{Math.sqrt}(\text{snippet.length}()) \quad \text{Equation (1)}$$

where P and N respectively represent the accumulation of positive and negative score of all words in snippet.

Thus, broadly speaking, topic words for use in sentiment topic recognition 200 are identified by classifying documents into categories of positive, negative and neutral using sentiment classification techniques 100 as illustrated in FIG. 1.

Figure 2:
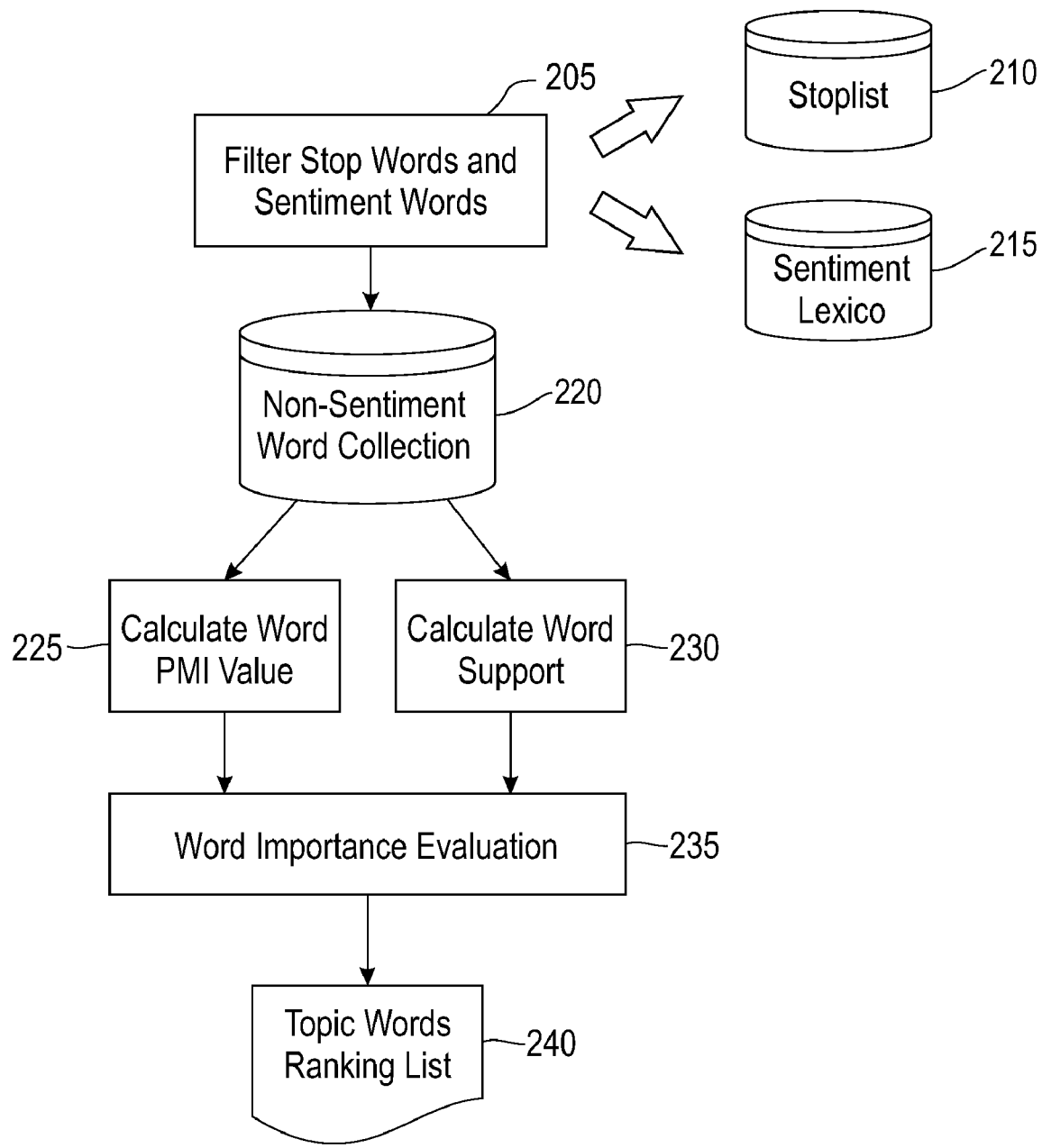
FIG. 2 is a block diagram of the sentiment word detection of the present invention.

FIG. 2 illustrates the process of sentiment topic recognition 200. Sentiment topic recognition may also be referred to as "sentiment based taxonomy." At 205, stoplist 210 and Sentiment Lexico 215 filter stop words and sentiment words. It should be noted that as used in this context, a stoplist is a list of words that can be ignored for purposes of text analytics. For example, "and," "but," "or," or "with" are typical words found on an English language stoplist.

After identifying all words in documents and filtering all stop words at 210 and sentimental words at 215, only non-sentiment words 220 are kept as sentiment topical word candidates. At 220, non-sentiment words are collected. Proceeding to 225, calculate the PMI value of the words in each sentiment category based on the Equation (2). Proceeding to 235, evaluate Word Importance and combine the frequency of the words in each category with its Pointwise Mutual Information (PMI) value and select the top frequent words with high PMI value as the final sentiment topic words for topic words ranking list 240.

During this process 200, the importance of each topic word is evaluated from two aspects. One is the word Pointwise Mutual Information (PMI) value 225 and another is word support in category 230. PMI (also called specific mutual information) is a measure of association used in information theory and statistics. PMI value between two discrete random variables reflects their dependence. The two variables are independent if the value is zero, and perfectly associated if the value is much more than zero, and complementary to each other if the value is much less than zero. PMI can discern the association between variables, but is always biased towards infrequent words. In the present approach, the factor of word support to balance the evaluation of association is also preferably considered.

It has been found that this scoring method was validated against human rated data and has a high degree of correlation to notions of sentiment. In a test, data was partitioned into five classes by sorting the snippets by sentiment score and creating a category for each quintile of data. The two extreme quintiles form a positive and a negative class, and the three middle quintiles are merged to form a single "neutral" class. Thus, the final taxonomy contains three categories: Positive, Negative, and Neutral. It has been found that two factors are preferable to detect sentiment topic words. Namely, word PMI value 225 and word support value 230. PMI value 225 evaluates the uniqueness of word to each sentiment category. The algorithm used to calculate the PMI value of word w against the category s is seen in Equation (2)

$$PMI(w,s) = \log(p(w,s)/(p(s)*(p(w)+0.05))) \quad \text{Equation (2)}$$

where, p(w,s) describes the co-occurrence between w and s, p(s) represents the distribution of category s and p(w) evaluates the distribution of word w in the whole snippet collection. Considering that the factor of p(s) has no influence on words ranking for each category, and therefore can be ignored.

Word support value 230 evaluates the importance of word in category. It is calculated as shown in Equation (3):

$$Freq(w, s) = N(w, s) \Big/ \sum_{s \in Positive, Negative, Neutral} N(w, s) \quad \text{Equation (3)}$$

where, N(w,s) denotes the number of word w in category s.

PMI and word supports evaluate the importance of a word to each sentiment category from different points of view. When considered simultaneously, they can detect relevant sentiment topic words. On the other hand, ignorance of any of them may negatively impact the ability to detect the important sentiment topical words. For example, suppose that words A and B have equal PMI value to a positive category, but their frequency in the positive category could be 1 and 100 respectively. Without the word support metric, the importance of A and B to the positive category may be considered equal, which could be misleading. On the contrary, assuming that the frequencies of words A and B in the positive category were both 100, but their occurrence frequencies in a negative category were 1000 and 0 respectively. Clearly, considering word frequency in single sentiment category alone may not be indicative to the difference of A and B to the positive category.

Referring again to FIG. 2, by collectively considering the factors of word PMI and word support frequency, significant topic words related to each sentiment category can be identified effectively. As discussed above, broadly speaking, topic words for use in ranking list 240 are identified through the following steps: Classify documents into categories of positive, negative and neutral using sentiment classification techniques as illustrated in FIG. 1; identify all words in documents and filter all stop words at 210 and sentimental words at 215, to keep only non-sentiment words 220 as sentiment topical word candidates and calculate the frequency of the words remaining in each single sentiment category as well as across all categories to establish word supports. Next, calculate the PMI value 225 of the words in each sentiment category based on the Equation (2). Next, evaluate Word Importance at 235 and combine the frequency of the words in each category with its PMI value and select the top frequent words with high PMI value as the final sentiment topic words for topic words ranking list 240.

Exemplary Computer Architecture for Implementation of Systems and Methods

Figure 3:
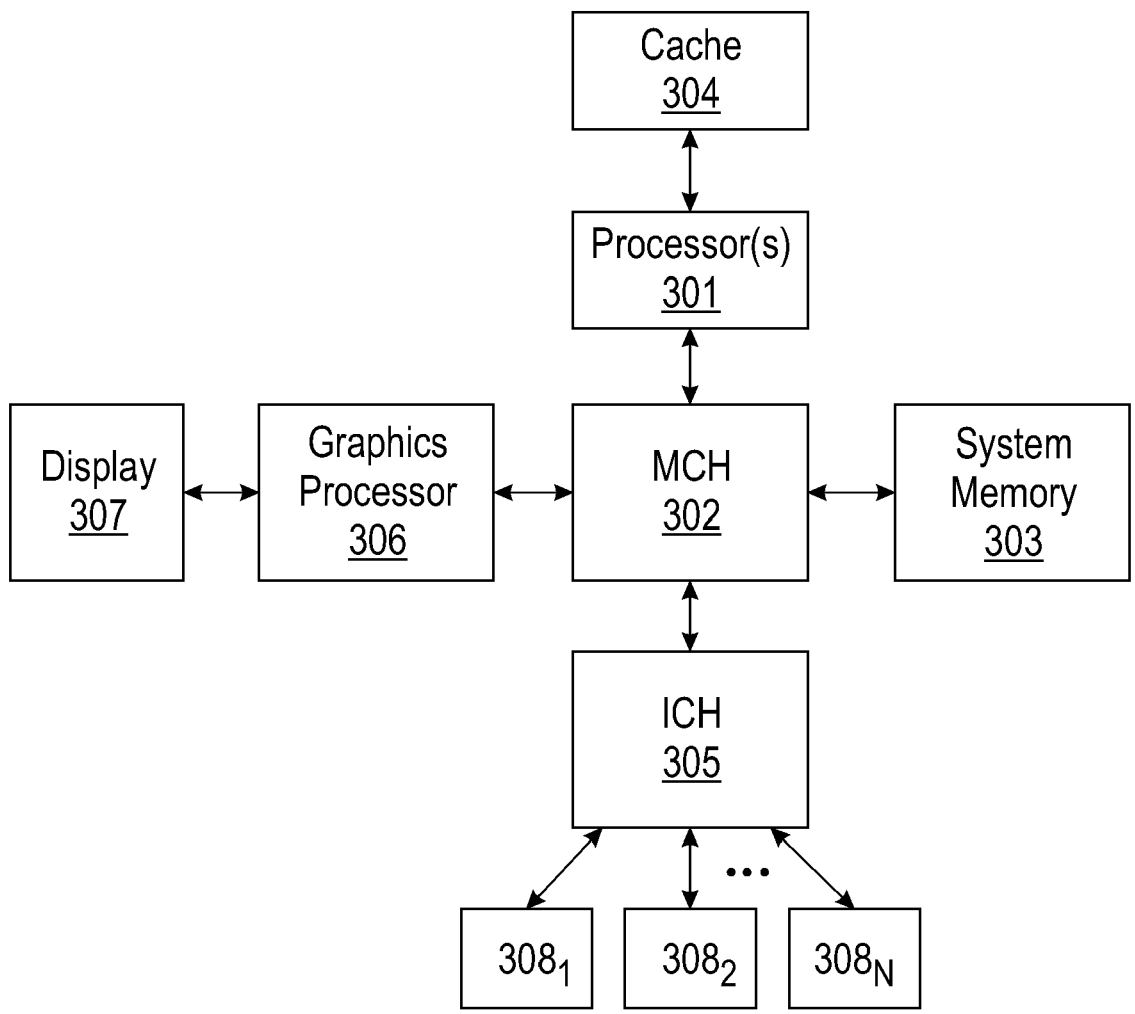
FIG. 3 is an example of computer architecture for implementing the embodiments as illustrated in FIGS. 1-2.

FIG. 3 illustrates an example of computer architecture for implementing the methods and flows as described in FIGS. 1-2. The exemplary computing system of FIG. 3 includes: 1) one or more processors 301; 2) a memory control hub (MCH) 302; 3) a system memory 303 (of which different types exist such as DDR RAM, EDO RAM, etc,); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells whilst system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large-scale non-volatile storage within the computing system (e.g., hard disk drive). ICH 305 has bi-directional point-to-point links between itself and the observed I/O devices 308.

Referring back to FIGS. 1-2, portions of the different embodiments of the described methods and flows may be embodied in software, hardware, firmware, or any combination thereof. Any software may be software programs available to the public or special or general-purpose processors running proprietary or public software. The software may also be a specialized program written specifically for signature creation and organization and recompilation management.

For the exemplary methods illustrated in FIGS. 1-2, embodiments of the invention may include the various processes as set forth above. The processes may be embodied in machine-executable instructions that cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented. For example, while it is described that a user may perform portions of the methods, an automated or computer process alternatively or in conjunction may perform those portions. In another embodiment, the models may be provided as previously generated.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer implemented method for analyzing sentiment concerning a subject, comprising:
   collecting a plurality of objects from at least one external content repository, wherein the collected objects form a content database;
   extracting snippets related to the subject from the content database;
   calculating a sentiment score for at least one snippet that has been extracted;
   for the at least one snippet for which the sentiment score has been calculated, classifying the snippet into at least one sentiment category;
   creating a sentiment taxonomy using the sentiment categories, wherein the sentiment taxonomy classifies the snippets as positive, negative or neutral;
   identifying topic words within the sentiment taxonomy;
   classifying the topic words as sentiment topic words or non-sentiment topic words;
   identifying the frequency of the non-sentiment topic words in each of the sentiment categories;
   identifying the importance of the non-sentiment topic words in each of the sentiment categories; and,
   ranking the non-sentiment topic words, wherein the rank for a non-sentiment topic word is calculated by combining the frequency of the non-sentiment topic word in each of the sentiment categories with the importance of the non-sentiment topic word.

2. The computer implemented method as in claim 1 wherein one external content repository is one from a group consisting of:
   a blog;
   a message board;
   a web page article; and
   a comment feed.

3. The computer implemented method as in claim 1 wherein identifying the importance of the non-sentiment topic words in each of the sentiment categories comprises calculating for each non-sentiment topic word a Pointwise Mutual Information of the non-sentiment topic word.

4. The computer implemented method as in claim 1 wherein identifying the importance of the non-sentiment topic words in each of the sentiment categories comprises calculating for each non-sentiment topic word a word support value for the non-sentiment topic word.

5. The computer implemented method as in claim 4 wherein identifying the importance of the non-sentiment topic word in each of the sentiment categories further comprises calculating for each non-sentiment topic word a Pointwise Mutual Information value for the non-sentiment topic word.

6. A system for analyzing sentiment concerning a subject, comprising a processor and a storage coupled to the processor, the processor configured to:
   collect a plurality of objects from at least one external content repository, wherein the collected objects form a content database;
   extract snippets related to the subject from the content database;
   calculate a sentiment score for at least one snippet that has been extracted;
   for the at least one snippet for which the sentiment score has been calculated, classify the snippet into at least one sentiment category;
   create a sentiment taxonomy using the sentiment categories, wherein the sentiment taxonomy classifies the snippets as positive, negative or neutral;
   identify topic words within the sentiment taxonomy;
   classify the topic words as sentiment topic words or non-sentiment topic words;
   identify the frequency of the non-sentiment topic words in each of the sentiment categories;
   identify the importance of the non-sentiment topic words in each of the sentiment categories; and,
   rank the non-sentiment topic words, wherein the rank for a non-sentiment topic word is calculated by combining the frequency of the non-sentiment topic word in each of the sentiment categories with the importance of the non-sentiment topic word.

7. The method system as in claim 6 wherein one external content repository is one from a group consisting of:
   a blog;
   a message board;
   a web page article; and
   a comment feed.

8. The system as in claim 6 wherein the processor is further configured, in identifying the importance of the non-sentiment topic words in each of the sentiment categories, to calculate for each non-sentiment topic word a Pointwise Mutual Information of the non-sentiment topic word.

9. The system as in claim 6 wherein the processor is further configured, in identifying the importance of the non-sentiment topic words in each of the sentiment categories, to calculate for each non-sentiment topic word a word support value for the non-sentiment topic word.

10. The system as in claim 6 wherein the processor is further configured, in identifying the importance of the non-sentiment topic word in each of the sentiment categories, to calculate for each non-sentiment topic word a Pointwise Mutual Information value for the non-sentiment topic word.

11. A computer program product comprising a non-transitory computer useable storage medium to store a computer readable program, wherein the computer readable program, when executed on a computer, causes the computer to perform for operations for determining analyzing sentiment concerning a subject, comprising:
   collecting a plurality of objects from at least one external content repository, wherein the collected objects form a content database;
   extracting snippets related to the subject from the content database;
   calculating a sentiment score for at least one snippet that has been extracted;
   for the at least one snippet for which the sentiment score has been calculated, classifying the snippet into at least one sentiment category;
   creating a sentiment taxonomy using the sentiment categories, wherein the sentiment taxonomy classifies the snippets as positive, negative or neutral;
   identifying topic words within the sentiment taxonomy;
   classifying the topic words as sentiment topic words or non-sentiment topic words;
   identifying the frequency of the non-sentiment topic words in each of the sentiment categories;
   identifying the importance of the non-sentiment topic words in each of the sentiment categories; and,
   ranking the non-sentiment topic words, wherein the rank for a non-sentiment topic word is calculated by combining the frequency of the non-sentiment topic word in each of the sentiment categories with the importance of the non-sentiment topic word.

12. The computer program product as in claim 11 wherein one external content repository is one from a group consisting of:
   a blog;
   a message board;
   a web page article; and
   a comment feed.

13. The computer program product as in claim 11 wherein identifying the importance of the non-sentiment topic words in each of the sentiment categories comprises calculating for each non-sentiment topic word a Pointwise Mutual Information of the non-sentiment topic word.

14. The computer program product as in claim 11 wherein identifying the importance of the non-sentiment topic words in each of the sentiment categories comprises calculating for each non-sentiment topic word a word support value for the non-sentiment topic word.

15. The computer program product as in claim 11 wherein identifying the importance of the non-sentiment topic word in each of the sentiment categories further comprises calculating for each non-sentiment topic word a Pointwise Mutual Information value for the non-sentiment topic word.

* * * * *